United States Patent Office 3,248,421
Patented Apr. 26, 1966

3,248,421
METHOD OF PREPARING 4,4-BIS(4-HYDROXY-ARYL) PENTANOIC ACIDS
Robert V. Smith, Racine, Wis., assignor to S. C. Johnson & Son, Inc., Racine, Wis.
No Drawing. Filed Apr. 26, 1963, Ser. No. 276,076
8 Claims. (Cl. 260—520)

This application is a continuation-in-part of copending application Serial No. 196,469, filed May 21, 1962, and now abandoned.

This invention relates to an improved method of preparing 4,4-bis(4-hydroxyaryl) pentanoic acids. More particularly, the invention relates to the preparation of 4,4-bis(4-hydroxyaryl) pentanoic acids in the presence of methyl mercaptan catalyst to provide a substantially pure product in improved yields.

The preparation of 4,4-bis(4-hydroxyaryl) pentanoic acids has been described in U.S. Patent Nos. 2,933,520 and 2,984,685. In these patents, the acids are prepared by condensing levulinic acid with a phenol in the presence of a mineral acid. It is suggested that catalytic materials can be advantageously used, including mercapto-acetic acid and mercapto-propionic acid. However, in the methods taught in the patents, it is necessary to react the phenol and levulinic acid in the presence of a mineral acid for extended periods of time to obtain only low yields of a resinous product. Moreover, the preparations taught in the patents invariably produce high ratios of side reaction products, requiring tedious and costly crystallization procedures to obtained the pure crystalline or amorphous acid.

Accordingly, it is an object of the instant invention to produce 4,4-bis(4-hydroxyaryl) pentanoic acids in improved yield.

It is another object of the instant invention to produce 4,4-bis(4-hydroxyaryl) pentanoic acids in a highly purified state without necessitating numerous crystallization steps.

It is another object of the instant invention to produce 4,4-bis(4-hydroxyaryl) pentanoic acids in substantial yields employing stoichiometeric quantities of a phenol and levulinic acid.

It is another object of the instant invention to produce 4,4-bis(4-hydroxyaryl) pentanoic acids in a purified condition employing relatively short reaction times.

These and other objects of the instant invention will become more apparent from the following detailed description with particular emphasis being placed on the illustrative examples.

In general, the process of the instant invention comprises reacting levulinic acid with a phenol in the presence of hydrochloric acid and methyl mercaptan catalyst. Adjustment of the ratio of levulinic acid to phenol and the concentration of hydrochloric acid, in relatively narrow ranges, is essential to provide improved yields in a given period of time. In the reaction, the need for the methyl mercaptan catalyst is critical. This catalyst, quite surprisingly, is highly specific to the instant reaction. Ethyl mercaptan, the next member on the homologous series, does not provide the improved performance as one would logically expect. Other mercaptan catalysts, such as mercapto-acetic or mercapto-propionic acid, while possibly providing some improvement, do not measure up to methyl mercaptan in performance. Although no apparent reason exists for the specific nature of methyl mercaptan to catalyze the present reaction, the material's surprising superiority is clearly apparent from the examples set forth hereinafter.

The ratio of methyl mercaptan can be varied over a range of from about 0.0125 to about 0.25 mole of catalyst per mole of levulinic acid. Concentrations below the above range have proven to be ineffective, whereas concentrations above this range do not appreciably increase the rate of reaction. Therefore, while higher ratios can be employed, the increased cost and difficulty of removal of the spent catalyst from the final product exceeds any added advantage realized.

The strength of the hydrochloric acid employed as condensing agent and reaction medium can vary from about 32% to about 60% HCl to provide satisfactory yields. However, for optimum efficiency, the strength of the hydrochloric acid lies in the range of from about 37–40%. Use of HCl of lower strength requires longer reaction times and/or higher reaction temperatures, resulting in darker and less pure products. The increased expense of obtaining acid strengths higher than about 40% tends to offset any advantage gained by their use. Moveover, the use of acids of increased concentrations may present problems due to corrosion of the processing equipment. Hydrochloric acid above the commercially available 37% is obtained by bubbling anhydrous hydrogen chloride into the reaction medium or by the in situ formation of HCl by chemical means, such as the reaction of concentrated sulphuric acid with sodium chloride.

Since the hydrochloric acid serves as the reaction medium as well as condensing agent, and the reaction produces a solid-liquid slurry, the minimum ratio of hydrochloric acid to levulinic acid for any specific strength is determined by the minimum volume of hydrochloric acid which will permit efficient agitation of the reaction slurry. Thus, the minimum volume of hydrochloric acid per mole levulinic acid exceeds about two moles of hydrogen chloride to about one mole levulinic acid. However, improved condensation is obtained when the hydrogen chloride ratio is increased to about three moles HCl per mole levulinic acid.

Stoichiometric ratios of phenol to levulinic acid are preferred in the instant process. In the prior art preparations, in most instances an increased amount of phenol was employed, apparently in an attempt to decrease the reaction times. However, this expediency increases the difficulty of purification of the final product as well as adds to the production cost. Thus, the instant process employing methyl mercaptan as the catalyst, which permits stoichiometric amounts of the reactants to be used, is decidedly superior. Although stoichiometric amounts of the reactants are preferred, slight deviations (up to about 0.5 mole of either reactant) can be tolerated without adverse effects. The presence of phenol in excess of this amount, however, should be avoided due to complications such as interference with precipitation either during the reaction or in subsequent purification of the crude product.

In the instant process, the rate of reaction under given processing conditions increases with increasing temperatures ranging from about room temperature to about 80° C. It is desirable, however, to operate at the lowest temperature possible consistent with practical times required for completion of the reaction, since at higher temperatures, side reactions become more prevalent leading to undesired colored products and/or formation of isomeric products. In the reaction employing methyl mercaptan as a catalyst, the optimum temperatures range from 40–60° C. At these temperatures, a substantially pure product is obtained when the reaction is terminated after about eight to about twenty-four hours. In the prior art preparations, the reactions required several days to provide only low yields of a resinous product.

As a refinement of the present invention, it is advantageous to add from 10–30% of acetic acid, based on the total weight of hydrochloric acid employed within the aforesaid range of from 32–60% HCl, to the reaction medium, intermediate during the reaction. As a result of the acetic acid addition, the reaction product precipitates more readily and provides a more highly crystalline final product with no residual mercaptan odor. Thus, after the phenol, levulinic acid, mercaptan catalyst and hydrochloric acid have reacted for a period of from 4 to 10 hours, the acetic acid is added to the reaction medium and the reaction continued an additional 14 to 20 hours. In addition to the advantages noted above, lower amounts of catalyst are operable. Although it is preferred to add the acetic acid after the reaction is partly completed, it is possible to charge the acetic acid with the phenol, levulinic acid, mercaptan catalyst and hydrochloric acid. However, if this is done, a longer reaction time is required to obtain a comparable yield.

In the following examples, Examples 1 and 2 are preferred embodiments of the instant invention employing methyl mercaptan as the catalyst. Examples 3, 4 and 5 are set forth to more explicitly demonstrate the superiority of the instant process over the prior art. Thus, in Example 3, no catalyst other than the mineral acid condensing agent is employed. In Example 4, ethyl mercaptan, the member of the homologous series immediately adjacent methyl mercaptan, is used. Example 5 demonstrates the superiority of methyl mercaptan over β-mercapto-propionic acid. Examples 6 and 7 illustrate secondary embodiments employing acetic acid in the reaction medium, providing improved precipitation and crystallization of the reaction product.

*Example 1*

Fifty-eight grams (0.5 mole) levulinic acid, 94 grams (1.0 mole) phenol, 148 grams 37% hydrochloric acid (1.5 moles HCl) and 2.4 grams (0.05 mole) of methyl mercaptan were placed in a 550 ml. pressure bottle stoppered with a wired-down sleeve stopper. The bottle with contents was clamped on its side in a constant temperature bath and rocked at 45° C. for 24 hours at which time a thick slurry of salmon-colored solid had formed. After removal from the bath and chilling to below room temperature, the bottle was opened and 200 grams of cold water were added. The resultant slurry was filtered on a Buchner funnel and the filter cake washed with an additional 300 ml. of cold water.

The crude 4,4-bis(4-hydroxyphenyl) pentanoic acid was dried to yield 133.7 grams (93.5% of theoretical) of the crude acid. The crude product was slurried with 500 ml. of water. 1.2 grams of anhydrous sodium bisulfite ($Na_2S_2O_5$) were added and the slurry brought to a boil. The 4,4-bis(4-hydroxyphenyl) pentanoic acid dissolved completely just before the boiling point was reached and its color changed from pink to tan. The hot solution was allowed to cool to room temperature while being stirred rapidly. The purified product first separated as an oil which solidified to a light tan, amorphous solid, which was filtered by suction and washed with water. This product was dried over night at 75–80° C. under vacuum to yield 127.5 grams (89.2% theoretical) of 4,4-bis(4-hydroxyaryl) pentanoic acid having a melting point of 172.5–174° C.

*Example 2*

Levulinic acid, phenol, 37% hydrochloric acid and catalyst were mixed in the same proportions and processed in the same manner as in Example 1. However, the reaction time at 55° C. was 16 hours. On purification, 133 grams (93% of theoretical) of 4,4-bis(4-hydroxyphenyl) pentanoic acid having a melting point of 172–174° C. was obtained.

*Example 3*

The instant example was carried out in a manner identical to that of Examples 1 and 2, except that no catalyst was included. After 24 hours reaction at 45° C., the reaction mixture consisted of a single phase clear solution indicating that relatively little conversion to 4,4-bis(4-hydroxyphenyl) pentanoic acid had occurred. Continuation of the reaction to 48 hours produced a second liquid phase. The product was isolated by decantation and washing of the resinous phase. Purification of the product was difficult. The yield was less than 10% of theoretical.

*Example 4*

This preparation was carried out in a manner identical to that of Examples 1 and 2, except that the catalyst was 3.10 grams (0.05 mole) of ethyl mercaptan. The reaction time at 55° C. was 16 hours. On purification, 108.2 grams (75% of theoretical) of 4,4-bis(4-hydroxyphenyl) pentanoic acid having a melting point of 172–174° C. was obtained.

*Example 5*

Levulinic acid, phenol, 37% hydrochloric acid and catalyst were mixed in the same proportions and the same manner as in Example 1, except that the catalyst was 5.3 grams (0.05 mole) of β-mercapto-propionic acid. After reacting at 45° C. for 24 hours, the 4,4-bis(4-hydroxyphenyl) pentanoic acid which precipitated was mushy and difficult to handle. The yield amounted to 92 grams (64% of theoretical).

*Example 6*

Fifty-eight parts (0.5 mole) levulinic acid, 94 parts (1.0 mole) phenol and 148 parts (1.5 moles) 37% hydrochloric acid, are charged to a pressure bottle and 0.3 part (0.00625 mole) methyl mercaptan is bubbled in. The bottle is sealed and placed in a shaker in a constant temperature bath at 55° C. After the reaction had progressed for 6 hours, the bottle is removed from the shaker, cooled immediately to about room temperature and 26.2 parts (0.44 mole) glacial acetic acid is added and the bottle returned to the 55° C. bath and shaking is resumed and continued for 18 hours (24 hour total reaction time at 55° C.). The bottle is then removed from the bath, the contents cooled to room temperature, held for two hours, filtered on a Buchner funnel and the product washed on filter with 3 dumps of 100 ml. water.

The damp crude pink product obtained above is charged with 215 ml. water and 0.6 gm. $Na_2S_2O_5$ to a flask fitted with thermometer and take-off condenser, heated to boiling, and about 100 ml. water are distilled off until a sample of the distillate remains clear on addition of aqueous mercuric chloride solution (indicating no residual mercaptan). The water remaining in the pot is equal to about one and one-half parts per part of reaction product present. With continued agitation the contents of the flask are allowed to cool to about 75° C. and are held at that temperature until crystallization occurs (about 1 hour). After the temperature of the crystallizing solution ceases to rise (5–7° C.) due to heat of crystallization, the slurry is cooled to room temperature, and suction filtered. The filter cake is washed on filter with two 100 ml. dumps of water and is then dried at 75° C. in a water aspirated vacuum oven. 128 parts (90% of theoretical) of pure 4,4-bis(4-hydroxyphenyl) pentanoic acid are obtained.

*Example 7*

Fifty-eight parts (0.5 mole) levulinic acid, 94 parts (1.0 mole) phenol and 148 parts (1.5 moles) 37% hydrochloric acid are charged to a pressure bottle and 0.3 part (0.00625 mole) methyl mercaptan is bubbled in. The bottle is sealed and placed in a shaker in a constant temperature bath at 55° C. After reaction has progressed for five and one-half hours, the bottle is removed from the shaker, cooled immediately to about room temperature and 26.2 parts (0.44 mole) glacial acetic acid is added and the bottle returned to the 55° C. bath and shaking is resumed and continued for eighteen and one-half hours (24 hour total reaction time at 55° C.). The bottle is then removed from the bath, the contents cooled to room temperature, held for two hours, filtered on a Buchner funnel and the product washed on filter with 3 dumps of 100 ml. water.

The damp crude pink product obtained above is charged with 215 ml. water to a flask fitted with thermometer and take-off condenser, heated to boiling and steam distilled, bubbling live steam through the crude product. The distillation was continued until approximately 125 ml. distillate was collected. The water remaining in the pot is equal to about one and one-half parts per part of reaction product present. With continued agitation the contents of the flask are allowed to cool to about 75° C. and are held at that temperature until crystallization occurs (about 1 hour). After the temperature of the crystallizing solution ceases to rise (5–7° C.) due to heat of crystallization, the slurry is cooled to room temperature and suction filtered. The filter cake is washed on filter with two 100 ml. dumps of water and is then dried at 75° C. in a water aspirated vacuum oven. The resultant 4,4-bis-(4-hydroxyphenyl) pentanoic acid, recovered at 89% of theoretical yield, is a light tan, almost white, highly crystalline material having a melting point of 172.5–173° C.

From the above examples, the exceptional superiority of methyl mercaptan as a catalyst in the instant reaction is apparent. Thus, in Example 1, an 89.2% yield was obtained in 24 hours operating at 45° C., using methyl mercaptan. In Example 2, a 93% yield was obtained in 16 hours operating at 55° C. Example 3, which was run without a catalyst under the identical conditions used in Example 1, gave a yield of less than 10%. Examples 4 and 5, employing ethyl mercaptan and mercapto-propionic acid, while providing yields somewhat superior to Example 3 where no catalyst was employed, were surprisingly inferior to Examples 1 and 2. Examples 6 and 7, employing acetic acid, intermediate in the reaction, provided products comparable to Examples 1 and 2, however, more complete precipitation of the crude reaction product, as well as a more crystalline final product with no residual mercaptan odor, was obtained.

In Examples 1, 2, 6 and 7, the unsubstituted phenol can be replaced by other phenols including the cresols, 2,6-diisopropyl phenol, and 2,5-xylenol. In general, operable phenols have the formula:

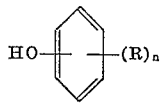

where R is a member of the group consisting of a lower alkyl radical (1 to 7 carbon atoms in a carbon-to-carbon chain), halogen and nitro; and $n$ is a number selected from the group consisting of 0. 1 and 2. Thus, the resultant acid will have the structure:

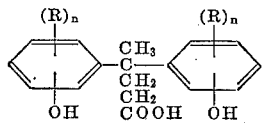

where R and $n$ have the same values as indicated above.

What is claimed is:

1. In the preparation of 4,4-bis(4-hydroxyaryl) pentanoic acid from a phenol and levulinic acid in the presence of a mineral acid condensing agent, the improvement wherein the condensing agent is hydrochloric acid having a strength of from about 32–60%; the phenol and levulinic acid are present in a ratio of from about 1.5–2.5 moles phenol per mole levulinic acid and the reaction is carried out in the presence of from 0.0125–0.25 mole methyl mercaptan catalyst per mole levulinic acid.

2. The improved preparation of claim 1 wherein 0.025–0.10 mole catalyst is used per mole of levulinic acid.

3. The improved preparation of claim 1 wherein the hydrochloric acid condensing agent has a strength of from about 37–40% HCl.

4. The improved method of claim 3 wherein the reaction product is purified by boiling in an aqueous solution of sodium bisulfite.

5. The improved preparation of claim 3 wherein the ratio of hydrochloric acid is in excess of two moles of hydrogen chloride to about one mole levulinic acid.

6. In the preparation of 4,4-bis(4-hydroxyaryl) pentanoic acid from levulinic acid and a phenol in the presence of hydrochloric acid, said phenol having the structure

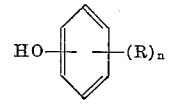

wherein R is a member of the group consisting of a lower alkyl radical, and halogen, and $n$ is a number selected from the group consisting of 0, 1 and 2, the improvement wherein the reaction is carried out in the presence of from 0.0125–0.25 mole methyl mercaptan.

7. The process of preparing 4,4-bis(4-hydroxyaryl) pentanoic acid comprising charging 1.5–2.5 moles phenol, 1.0 mole levulinic acid, 0.0125–0.25 mole methyl mercaptan, and 2.0–3.0 moles 32–60% hydrochloric acid to a reaction flask, heating at a temperature of from about 40–60° C. with agitation for a period of from 4 to 10 hours, adding from about 10–30% acetic acid, based on the total weight of hydrochloric acid employed, and thereafter, continuing the reaction for an additional 14 to 20 hours.

8. The process of claim 7 wherein the hydrochloric acid has a strength of from about 37–40% HCl and the amount of acetic acid is 15% of the total weight of the hydrochloric acid.

References Cited by the Examiner
UNITED STATES PATENTS

| | | | |
|---|---|---|---|
| 2,394,572 | 2/1946 | Utermohlen | 260—701 |
| 2,933,520 | 4/1960 | Bader | 260—473 |
| 2,984,685 | 5/1961 | Holmen | 260—559 |

LORRAINE A. WEINBERGER, *Primary Examiner*.